United States Patent [19]

Neupauer, deceased

[11] Patent Number: 4,887,200
[45] Date of Patent: Dec. 12, 1989

[54] METHOD AND APPARATUS FOR DETERMINING THE ACTUAL VALUE OF THE MARGIN-ANGLE IN THE VALVES OF AN INVERTER

[75] Inventor: Helmut Neupauer, deceased, late of Erlangen, Fed. Rep. of Germany, by Elfriede Neupauer, heir

[73] Assignee: Siemens Aktiengesellschaft, Munich, Fed. Rep. of Germany

[21] Appl. No.: 248,554

[22] Filed: Sep. 23, 1988

[30] Foreign Application Priority Data

Sep. 24, 1987 [DE] Fed. Rep. of Germany ....... 3732228

[51] Int. Cl.$^4$ ............................................ H02M 1/084
[52] U.S. Cl. ........................................ 363/81; 363/35; 363/51; 363/129
[58] Field of Search ...................... 363/35, 51, 58, 81, 363/87, 129, 137; 324/86, 107

[56] References Cited

U.S. PATENT DOCUMENTS 3,771,041  11/1973  Chadwick ............................ 363/81
4,554,623  11/1985  Ainsworth .......................... 363/137

FOREIGN PATENT DOCUMENTS 3340540  5/1985  Fed. Rep. of Germany .
3346291  7/1985  Fed. Rep. of Germany .
3007221  5/1986  Fed. Rep. of Germany .

OTHER PUBLICATIONS

Galanos et al, "Direct Digital Control of HVDC Converter," IEEE Trans. on Pwr. App. and Syst's., vol. PAS-89, No. 8, Nov./Dec. 1970, pp. 2056-2065.
"Elektrotechnische Zeitschrift ETZ," vol. 102 (1981) pp. 14-18 (1981).
"Voltage Circuit for an HVDC Convertor" O'Kelly, IEEE Proceedings, vol. 131, pp. 5-15 (1984).
"Microprocessor-Controlled HVDC Simulator", J. A. Arrillaga et al., IEEE Proceedings, vol. 131, pp. 197-203 (1984).

Primary Examiner—William H. Beha, Jr.
Attorney, Agent, or Firm—Kenyon & Kenyon

[57] ABSTRACT

A method and apparatus for determining the quenching angle in inverter valves, in which the pulse-shaped deviations, which occur in the valve voltages due to the current commutations as compared to the corresponding fundamental waveforms, are blanked out in the form of voltage blocks. For the duration of the quenching angle, a binary measuring signal is generated which is triggered by an end-of-conduction pulse and is terminated by a zero voltage crossing pulse. The end-of-conduction pulse indicating the completion of the commutation is formed by the flank at the end of the voltage shift caused by the preceeding commutation in the valve voltage as compared to the fundamental waveforms.

11 Claims, 5 Drawing Sheets

METHOD AND APPARATUS FOR DETERMINING THE ACTUAL VALUE OF THE MARGIN-ANGLE IN THE VALVES OF AN INVERTER

FIELD OF THE INVENTION

The present invention relates to a method for determining the margin angle in the valves of an inverter, for instance an inverter, in an installation for high-voltage d-c (HVDC) transmission. The term "quenching" will be used in the following description in place of the term "margin," it being understood that the two terms are equivalent. The quenching angle is determined from the difference between the phase angle of a zero-crossing of the valve voltage and the phase angle of an end-of-conduction pulse indicating the extinction of the current through a particular valve due to a preceding current commutation. The present invention also relates to an apparatus for carrying out the method according to the invention.

BACKGROUND OF THE INVENTION

An inverter which serves for example at one end of an installation for high-voltage d-c transmission that feeds power to an adjoining a-c network, is frequently operated at a minimal quenching angle to provide an optimum active-power transport. As is well known, the quenching angle also known as the recovery time, must always be larger than a release time specified for the structural components of the valves (thyristors) used in the inverter. The minimum quenching angle is therefore a measure of the time period for which a negative anode-cathode voltage must be present at a particular valve after a current interruption before that valve can be stressed again by a positive blocking voltage. If this minimum quenching angle is observed, the valve remains in its current-blocking state and will not flip by itself back into a current-conducting state.

For adaptation to changed operating conditions, this minimum value of the quenching angle is frequently set by a quenching angle control. A method and apparatus for operation of a high-voltage d-c transmission system is described in German Published Unexamined Patent Application No. 33 40 540 in which the control times of a quenching angle control for the output of an HVDC long-distance transmission are greatly shortened by a pilot control for that output. In this manner, a continuous flip-proof operation of the inverter at an inverter step limit and at the same time at optimum efficiency are possible. An apparatus designated in that German Application as a "protection time control" for optimum utilization of an inverter-fed synchronous machine regarding the network and machine power factor is described in the paper by R. Saupe in Elektrotechnische Zeitschrift ETZ, Vol. 102, (1981) No. 1, on pages 14 to 18. (That paper relates to German Patent No. 307 221.) Instead of setting a constant minimum protection time value made out for the operating point with the largest permissible cos $\rho$, i.e., for maximum values of current and speed of rotation, the minimum protection time value is controlled in such a manner that the machine inverter always operates at the inverter flipping limit at an optimum cos $\rho$, as well as for heavy load-dependent changes of the actual quenching angle value.

In German Patent No. 307 221, the negative voltage present at each value for the duration of the protection time is blanked out, and a binary signal indicating its duration is digital-to-analog converted via an integrator followed by a sample-and-hold memory. With an additional device contained in the apparatus of German Patent No. 307 221, the negative voltages occurring at each individual valve (or thyristor) are determined directly and their duration in time is evaluated. To this end, voltages must be taken off at five points in a six-pulse inverter. These are the three phase voltages at the inverter output, and the intermediate phase to phase voltage at the inverter inputs as reference potentials for the phase voltages. This method for determining the actual quenching angle values via direct evaluation of the negative valve voltages has the disadvantage that in particular, two additional d-c voltage converters must be provided for determining the two potentials of the intermediate phase-to-phase voltage serving as reference quantities. Particularly in an inverter which is used in an HVDC system, the employment of d-c inverters at such a point is very costly due to the high d-c voltages on the transmission line. In addition, because of the unavoidable measuring inaccuracies of d-c converters, the quality of d-c voltage converters required by a quenching angle control can frequently not be achieved in this manner, and thereby, sufficient protection against undesired inverter flipping is not assured.

In another known method for determining the actual value of the quenching angle, the currents and voltages of the individual phases are determined. The rising flank of a binary signal indicating the quenching angle is formed directly via a current measurement by a conduction end signal when the valve current is quenched. The falling flank of the binary signal is formed by the subsequent zero crossing of the valve voltage determined via a voltage measurement. In this known method the additionally required a-c converters increase the measuring inaccuracy, especially due to the unavailable phase rotation of the converter output signals relative to the original signals.

Thus, the known methods have the problem of measuring inaccuracy in determining the actual value of the quenching angle, because of the need for further measurement variables at the inverter output.

SUMMARY OF THE INVENTION

The present invention provides a solution to this and other problems by providing a method for determining the actual quenching angle value and apparatus for carrying out the method where no further measurement variables are required at the inverter output, except for the voltages on the a-c voltage side.

The method for determining the quenching angle at the valves of an inverter in an installation for high-Voltage d-c transmission according to the present invention comprises the steps of forming an end-of-conduction pulse indicating extinction of a current through a corresponding valve due to a preceding current commutation. This end-of-conduction pulse is formed with an end of a deviation of a valve voltage from a waveform of a corresponding fundamental, this deviation occurring for the duration of the commutation. A phase angle of the end-of-conduction pulse and a phase angle of a zero crossing of the valve voltage are determined. A difference is formed between the phase angle of the zero crossing of the valve voltage and the phase angle of the end-of-conduction pulse.

An apparatus which solves the above-mentioned problems is also provided by the invention. The apparatus forms a binary measurement signal indicating a quenching angle at the valves of an inverter. The apparatus comprises measuring transmitter means for sensing a voltage corresponding to a valve voltage, and a filter, coupled to the measuring transmitter means, which provides at its output a waveform of a fundamental of the valve voltage. A subtraction circuit, having one input coupled to the filter and another input coupled to the measuring transmitter means, provides as an output the deviation of the valve voltage from the corresponding fundamental waveform. A first means for analog-to-digital conversion produces from the deviation of the valve voltage from the fundamental waveform, an end-of-conduction pulse indicating the phase angle at the instant of the extinction of the valve current. A second means for analog-to-digital conversion forms from the valve voltage a zero voltage crossing pulse which indicates the phase angle at the instant of a zero crossing. The apparatus also comprises means for producing a binary measuring signal for the duration of the quenching angle. This means for producing is set by the end-of-conduction pulse and reset by the zero voltage crossing pulse.

DETAILED DESCRIPTION

Referring to the waveforms illustrated in FIG. 1, the method according to the invention will be explained in greater detail in the following. Phase-to-phase voltages $u_{RS}$, $u_{ST}$, $u_{TR}$ between the phases of a three-phase six-pulse inverter are used as valve voltages for determining the respective quenching angle in the illustrated example shown in the upper part of FIG. 1. Although the phase-to-phase voltages are used in the following example, the phase voltages referred to a common potential and the anode-cathode voltages taken directly off every individual valve can also serve as valve voltages. Using phase-to-phase voltages as the valve voltages however, has the special advantage that they can be taken off at any point, especially outside the inverter at the output on the a-c voltage side. In a three-phase system, only three a-c voltage transformers are required for this purpose. Thus, no direct intervention into the internal design of the inverter is necessary, as is the case under some conditions with direct tapping of the individual anode-cathode voltages. Since voltages from the inverter itself are no longer unconditionally needed to practice the method according to the invention, the extraction of such signals may be completely dispensed with when light-fired thyristors are used, for example.

Figure 1:
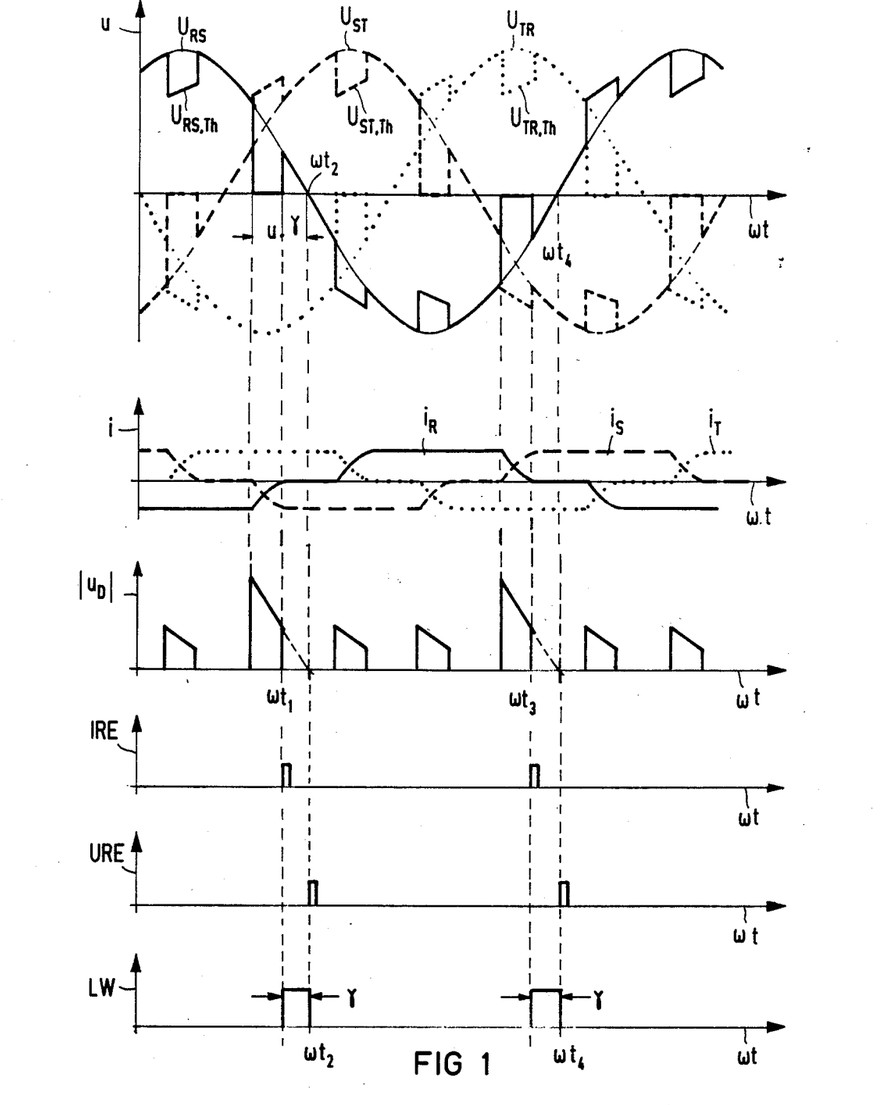
FIG. 1 shows voltage and current waveforms for forming a binary signal indicating the quenching angle according to the invention.

In conjunction with the waveforms of the phase currents $i_R$, $i_S$, $i_T$ as shown in FIG. 1, it can be seen that each commutating process, i.e., the simultaneous decay and rise of two phase currents due to the temporary conduction of two valves, is imaged in the course of every voltage as a temporary voltage lowering or rise. To explain the principle of the method according to the invention, it is sufficient to consider the waveforms of the voltages $u_{RS}$, $u_{RS,Th}$ and of the corresponding phase current $i_R$, which are all shown in FIG. 1 by solid lines.

The pulse-like displacements (the voltage lowering or rise) can be correlated in the course of the actual valve voltage $u_{RS,Th}$ with a commutating process connected with the extinction of the current $i_R$ and are therefore suitable for the evaluation of the corresponding quenching angle. The displacements jump to the value zero from the fundamental waveforms $u_{RS}$ (shown by a thin line) in the overlap period u. At all other voltage displacements jumping to an intermediate value, the valves in the other phases of the inverter take part. Thus, it is always the third voltage break, which is immediately before a zero crossing of the valve voltage $u_{RS,Th}$, that is suited for determining the quenching angle of the two valves of the phase R of an inverter which is assumed to be three-phase and six-pulse.

The Waveform of $u_{RS,Th}$ shown in FIG. 1 contains two such voltage breaks, the ends of which are always marked with the phase angle $\omega t_1$ and $\omega t_3$, respectively. The flanks (or edges) of these pulse-like deviations of the actual valve voltage $u_{RS,Th}$ from the waveform $u_{RS}$ of the fundamental, correspond to the phase angles in which the corresponding phase current just begins to decrease or to be extinguished. At the end of the respective commutation processes i.e., upon the extinction of the current $i_R$ at the phase angles $\omega t_1$ and $\omega t_3$, the actual valve voltage $u_{RS,TH}$ again jumps to the full value of the fundamental waveform $u_{RS}$. A negative anode-cathode voltage is present at the particular inverter valve for a period corresponding to the quenching angle to be determined, until the following zero crossing of the valve voltage at the phase angles $\omega t_2$ and $\omega t_4$, respectively. The angular range the respective differences of the phase angles $\omega t_2$, $\omega t_4$ at the instant of the zero crossing of the valve voltage $u_{RS,Th}$ and the phase angles $\omega t_1$, $\omega t_3$ at the instant of the extinction of the current $i_R$ through the respective valve.

According to the present invention the "becoming zero" which marks the start of the angular range $\alpha$ to be determined of the commutating-off phase current is now indicated by the flank at the end of the deviation of the actual valve voltage from the corresponding fundamental waveform. Such a method has the advantage that the beginning of the quenching angle can be determined substantially more accurately than is possible, for instance with a direct evaluation of the phase current via a current measurement.

In FIG. 1, the deviations, due to the commutations between the phases R and S of a three-phase inverter of the actual valve voltage $u_{RS,Th}$ from the corresponding fundamental waveform $u_{RS}$ are blanked out as shown by the example of the phase-to-phase voltage between the phases R and S of a three-phase inverter. Of these voltage blocks $|u_D|$ obtained from the absolute magnitude of the difference $u_D = u_{RS} - u_{RS,Th}$, the falling flanks at the end of the third and sixth blocks are s suitable for marking a corresponding end-of-conduction in the phase under consideration. The voltage blocks suitable for determining the starting angles $\omega t_1$ and $\omega t_3$, and the measurement of the quenching angle are furthermore distinguished by a larger rising flank as compared to the other voltage blocks.

In an embodiment of the invention, a binary measurement signal LW is generated for the duration of the quenching angle α to be determined. This is preferably released by an end-of-conduction pulse IRE that is triggered by the falling flank of the deviation signal $|u_D|$ at the phase angles $\omega t_1$ and $\omega t_3$ and is terminated by a zero voltage crossing pulse URE triggered by the zero crossing of the valve voltage $u_{RS,Th}$ at the phase angles $\omega t_2$ and $\omega t_4$. The binary signals IRE, URE and LW are shown in FIG. 1. The binary measurement signal LW which is terminated at the phase angles $\omega t_2$ and $\omega t_4$, respectively, is a measure of the quenching angle of one or the other valve in the phase R considered as an example here, of an inverter assumed to be three-phase and six-pulse. Such a measurement signal can be fed as an actual analog value for example, to a quenching angle control This would be done after a digital-analog conversion, such as by an integrator followed by a sample-and-hold circuit. To reduce the dead times between the actualizations of such an actual quenching angle value, it is particularly advantageous if the quenching angles of all the valves of all the phases of an inverter are determined in the manner according to the invention and are preferably processed via a single analog-digital converter to form a common actual quenching angle value.

According to another embodiment of the invention it is also contemplated to form the end-of-conduction process for the valves of all inverters in common by means of a single valve voltage. As already explained above and from FIG. 1, all commutation processes are imaged, for instance, in the actual valve voltage $u_{RS,Th}$ and form a corresponding voltage block $u_D = u_{RS,Th} - u_{RS}$.

Figure 2:
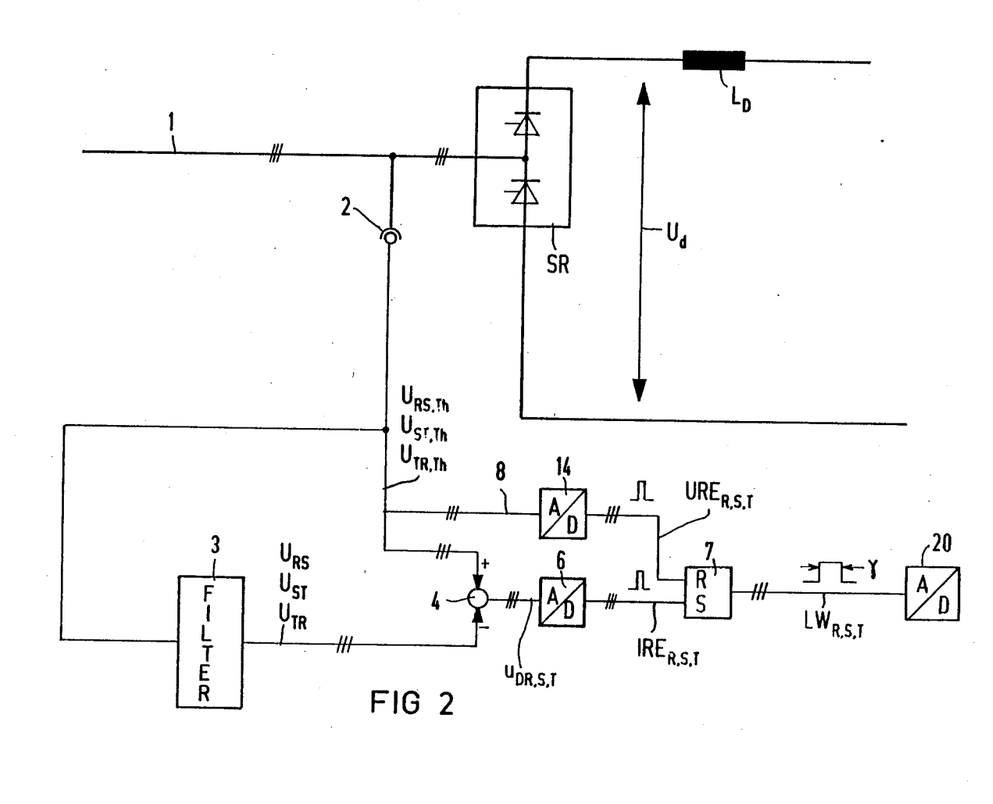
FIG. 2 is a block diagram of an embodiment of the apparatus according to the invention for forming the quenching angle in a six-pulse inverter.

FIG. 2 shows an advantageous embodiment of apparatus which operates in accordance with the method of the invention. A three-phase and six-pulse inverter SR, of which only the valves of one phase are shown for the sake of greater clarity, feed, as part of an HVDC installation the input of an a-c voltage network 1 of a d-c voltage $U_D$. A first measuring generator 2 determines at least one of the phase-to-phase voltages $u_{RS,Th}$, $u_{ST,Th}$ and $u_{TR,Th}$ as valve voltages. These valve voltages are fed to a filter 3 and a subtraction circuit 4.

The filter 3 reconstructs from the actual valve voltages having voltage displacements, the corresponding fundamental waveforms $u_{RS}$, $u_{ST}$, $u_{TR}$ and feeds them to the other input of the subtraction circuit 4. At the output of the subtraction circuit are the deviations $u_{D,R}$, $u_{D,S}$, $u_{D,T}$ of the respective valve voltages from the corresponding fundamental waveform in the form of the blanked-out voltage blocks $u_D$. These deviations $u_{D,R}$, $u_{D,S}$, $u_{D,T}$ are preferably separated for each phase.

A first analog-to-digital converter 6 recognizes the voltage block belonging to a current commutation in one of the phases and generates as its end, simultaneously with the falling flank, an end-of-conduction pulse $IRE_R$, $IRE_S$ or $IRE_T$ indicating the termination of the respective commutation. The recognition of a voltage block belonging to a given commutation in a given phase from the block sequences $u_{D,R}$, $u_{D,S}$, $u_{D,T}$ can be accomplished, for example, by feeding the firing signals of the individual valves to the first analog-digital converter 6.

A second analog-digital converter 14 evaluates the actual valve voltages on a signal line 8 and generates at each zero crossing a zero voltage crossing pulse $URE_R$, $URE_S$, or $URE_T$ associated with the respective phase at each zero crossing. The end-of-conduction pulses and the zero voltage crossing pulses of each phase serve for addressing binary means 7 which, in the illustrated embodiment, is a three-phase RS flip-flop. The output of the first analog-digital converter 6 which makes the respective end-of-conduction pulse $IRE_{R,S,T}$ available, is brought to one of the setting inputs of the binary means 7. The output of the second analog-digital converter, which provides the respective zero voltage crossing pulse $URE_{R,S,T}$, is brought to the corresponding resetting input of the binary means 7. The output of the binary means 7 is a binary measurement $LW_R$, $LW_S$ and $LW_T$ for the duration of the quenching angle in the respective phase. These binary signals $LW_R$, $LW_S$ and $Lw_T$ can be processed via a further digital-analog converter 20 to form a common actual quenching angle value.

Figure 5:
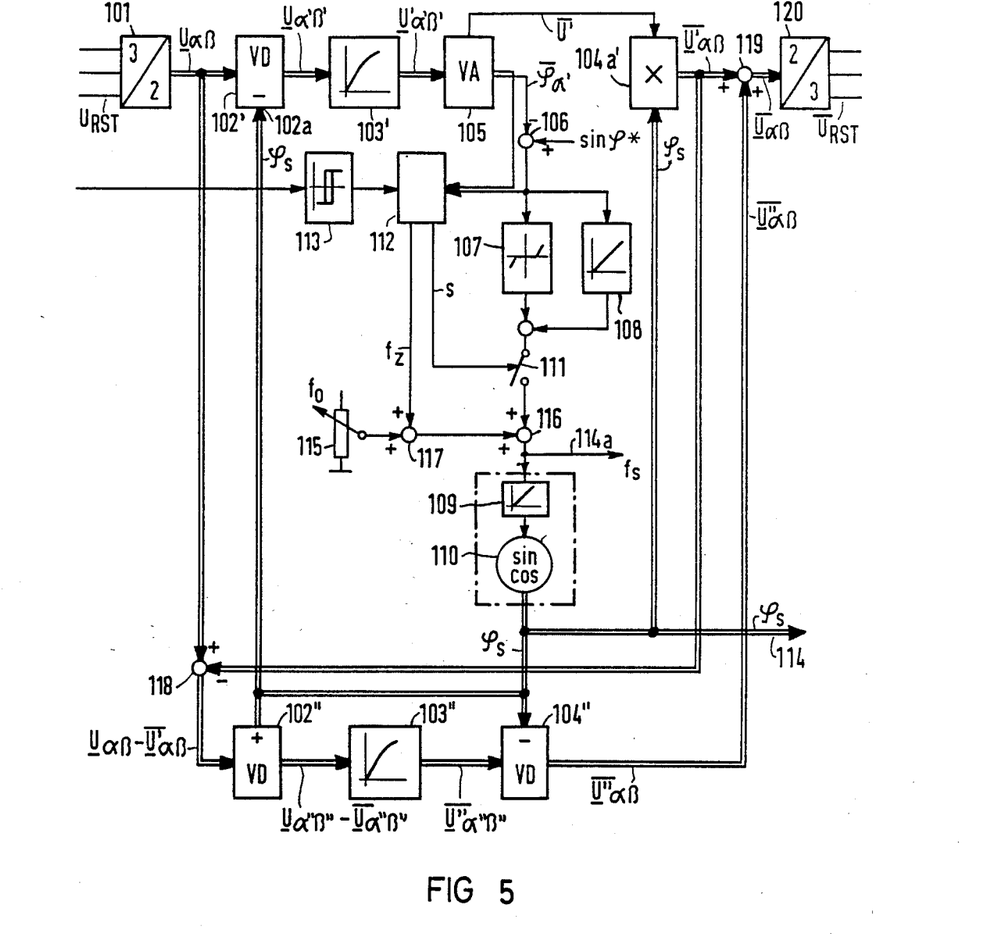
FIG. 5 is a block diagram illustrating an embodiment of a filter for determining the waveforms of fundamentals.

In FIG. 5, an embodiment for a filter 3 for determining the waveform of the fundamental is shown. A network pickup member 101 at the filter input picks up the valve voltages $u_{RS,Th}$, $u_{ST,Th}$, $u_{TR,Th}$ (designated as $U_{RST}$) that are supplied by the measuring transmitter 2 in FIG. 2, and converts them into the a-c voltage components of an orthogonal coordinate system fixed in space. A first vector rotator 102' transforms these a-c voltage components fixed in space into the components of an orthogonal rotating reference system, the transformation angle of which is set via an additional angle input 102a. A subsequent first smoothing member 103' forms from the orthogonal rotating components further components which are designated as transformed concurrent system components and that are fed to a vector analyzer 105.

The vector analyzer 105 makes available at each angle signal and magnitude output, actual frequency and amplitude values. The actual frequency value is fed to the frequency control input 116 of a control element comprising an integrator 109 followed by a sine-cosine transmitter 110. The actual amplitude value is fed to a multiplier 104a'.

Between the vector analyzer 105 and the control element, further circuit elements are arranged which preferably include a control device 112 actuated by a network monitor 113; a reference frequency value generator 115; and a switch 111 actuated by the control device 112. The network monitor 13 reacts to the shifts due to the commutation in the voltages and interprets them as a network disturbance. The control device 112 will open the switch 111 in response to a network disturbance, so that the direct connection between the angle signal output of the vector analyzer 105 and the frequency control input 116 of the control element is interrupted and temporarily switched to a stored frequency value. To this end it is advantageous if the network monitor 113 is addressed by the signal at the output of the subtraction circuit 4 in FIG. 2. In this manner the voltage shift present in the actual valve voltages $U_{RST}$ due to the current commutation can be filtered out and the fundamentals synchronous with the network can be reconstructed. The filtered frequency value at the output of the control element is combined by the multiplier 104a' with the amplitude signal of the vector analyzer 105 and are made available, after a further conversion in the element 120, in the form of the fundamentals at the output of filter 3. The filtered frequency value at the output of the control element also serves as the transformation frequency for the vector rotator 102, at the filter input.

The illustrated filter of FIG. 5 also takes into account a counter system contained in a fundamental in its reconstruction. This purpose is served by the vector rotators 102", 104" and a second smoothing member 103".

The exact operation of the embodiment of the filter 3 shown in FIG. 5 is described, along with other possible circuit variants, in detail in German Published Unexamined Patent Application No. 33 46 291. The circuit is used there without any internal changes for forming phase-correct reference voltages, by means of which a system for high voltage d-c transmission can be started up again synchronously with the network as fast as possible after a network disturbance is over. It is advantageous if this already existing circuit can be used concurrently without any additional means, in an automatic restarting system of an HVDC system, for example, and simultaneously as a filter for a device for determining the actual quenching angle value according to the present invention.

Figure 3:
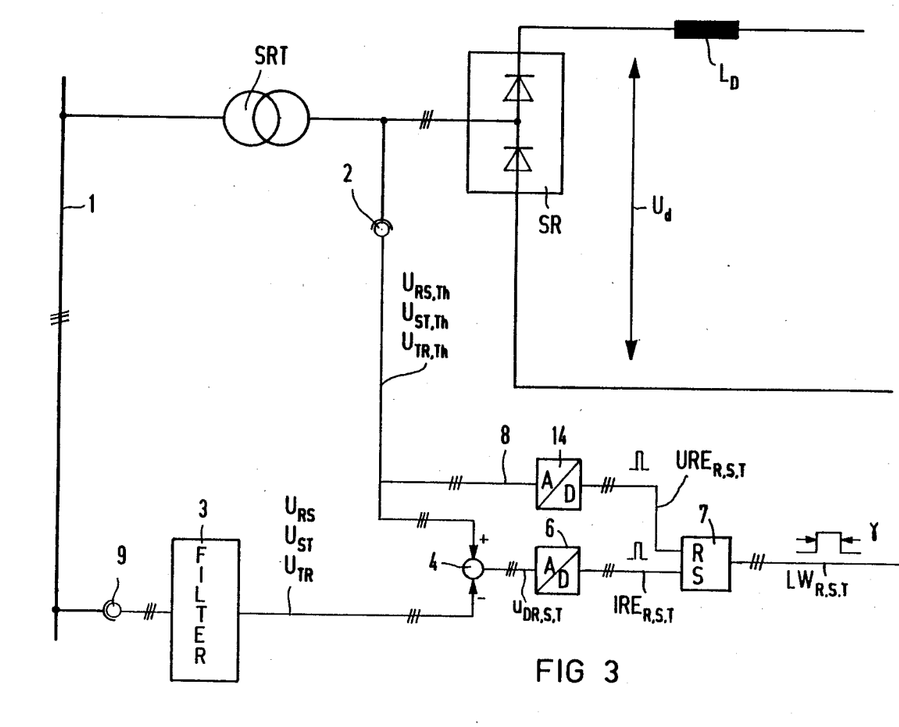
FIG. 3 is a block diagram of a further embodiment of the apparatus according to the invention of an inverter with an additional converter transformer on the a-c voltage side.

In FIG. 3, another embodiment of the apparatus according to the invention is shown. Here, the inverter SR is connected via an additional converter transformer SRT, for instance, to a part of the network 1 designed as a bus bar. Such an arrangement has the advantage, in addition to a possible adaptation of the level of the inverter output voltages to the network voltages, that the voltage shifts in the valve voltages caused by the commutations no longer penetrate to the network but are instead partially smoothed via the converter transformer SRT. In such an arrangement, the filter 3 is also directly connectable to the bus bar 1 via a second measuring generator 9 as long as the transformation ratio of the converter transformer SRT is taken into consideration in the filter 3 itself.

Figure 4:
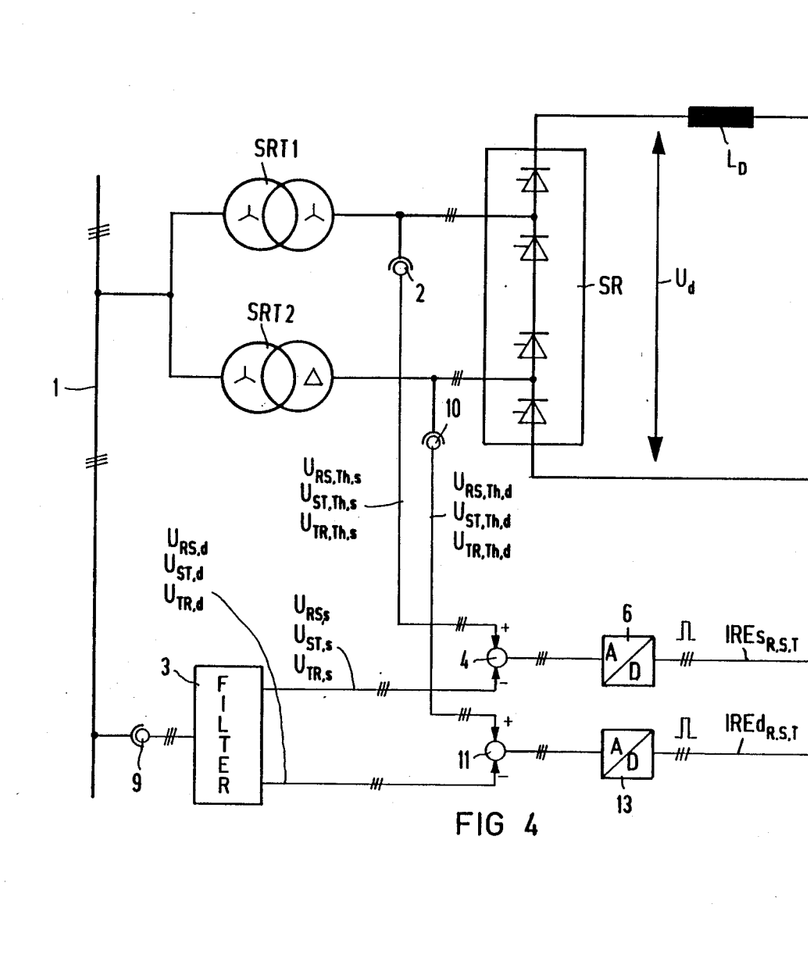
FIG. 4 is a block diagram of a further embodiment of the apparatus according to the invention for a twelve-pulse inverter with additional converter transformers on the a-c voltage side.

A further embodiment of the apparatus according to the invention is shown in FIG. 4 by the example of a twelve-pulse inverter. In such a case, each half of the inverter feeds as a rule a converter transformer of its own which are preferably connected via different winding systems to the outputs of the inverter on the low-voltage side. Thus, the first and second converter transformers SRT1 and SRT2, respectively, are connected in FIG. 4 to the corresponding output of the inverter SR via a Y- or delta-connected winding system s or d. In the illustrated embodiment, the voltage systems delivered by the upper or lower part of the inverter are first processed separately to form an actual quenching angle value. To this end, measuring generators 2 and 10 pick up the valve voltages $u_{RS,Th,s}$, $U_{ST,Th,s}$, $U_{TR,Th,s}$ and $u_{RS,Th,d}$, $u_{ST,Th,d}$, $u_{TR,Th,d}$. From these are blanked out again the corresponding deviations $u_{D,s}$ or $u_{D,d}$. The blanking out is done by two separate subtraction members 4 and 11, by means of the fundamental waveforms $u_{RS,s}$, $u_{ST,s}$, $u_{TR,s}$ or $U_{RS,d}$, $u_{ST,d}$, $U_{TR,d}$.

After a separate analog-digital conversion in the elements 6 and 13, respectively, end-of-conduction pulses IRE $s_{R,S,T}$ and IRE $d_{R,S,T}$ are available separately for each phase and for each of the two voltage systems at the inverter output. These can be processed in the manner already described by means of the zero voltage crossing pulses to form corresponding binary measuring signals $LWs_{,R,S,T}$ and $LWd_{R,S,T}$. The elements required for the formulation of the zero voltage crossing pulses are not shown in FIG. 4 for better clarity.

What is claimed is:
1. A method for determining the margin angle at the valves of an inverter, the method comprising the steps of:
   forming an end-of-conduction pulse indicating extinction of a current through a corresponding valve due to a preceding current commutation, said end-of-conduction pulse being formed with an end of a deviation of a valve voltage from a waveform of a corresponding fundamental, said deviation occurring for the duration of said commutation;
   determining a phase angle of said end-of-conduction pulse, and a phase angle of a zero crossing of said valve voltage; and
   forming a difference between said pulse angle of said zero crossing of said valve voltage and said phase angle of said end-of-conduction pulse.
2. The method according to claim 1, wherein said inverter is a three-phase inverter, and the valve voltage is at least one of a plurality of phase-to-phase voltages at an output of the inverter.
3. The method according to claim 2, further comprising the step of forming a common actual margin angle value from quenching angles determined for individual valves in different inverter phases.
4. An apparatus for forming a binary measurement signal indicating a margin angle at valves of an inverter, the apparatus comprising:
   (a) measuring transmitter means for sensing a voltage corresponding to a valve voltage,
   (b) a filter having its input coupled to said measuring transmitter means, and providing at its output a waveform of a fundamental of said valve voltage,
   (c) a subtraction circuit, having one input coupled to said filter and another input coupled to said measuring transmitter means, providing as an output the deviation of said valve voltage from a corresponding said fundamental waveform,
   (d) first means for analog-to-digital conversion, having an input coupled to said output of said subtraction circuit, for producing from said deviation of the valve voltage from the fundamental waveform an end-of-conduction pulse indicating a phase angle at an instant of extinction of a valve current,
   (e) second means for analog-to-digital conversion having an input coupled to said measuring transmitter means for forming from said valve voltage a zero voltage crossing pulse indicating a phase angle at an instant of a zero crossing, and
   (f) means for producing a binary measuring signal for the duration of the margin angle, said means for producing being set by said end-of-conduction pulse and being reset by said zero voltage crossing pulse.
5. The apparatus according to claim 4, wherein said voltage corresponding to said valve voltage is a phase-to-phase voltage, said inverter is a three-phase inverter, and said measuring transmitter means is coupled to an output of said inverter so as to pick up at least one of said phase-to-phase voltages.
6. The apparatus according to claim 4, wherein said means for producing a binary signal is an RS flip-flop.
7. The apparatus according to claim 4, further comprising a converter transformer coupled to said inverter, and a bus bar coupled to said converter transformer, wherein said measuring transmitter means is a first measuring transmitter coupled between said subtraction circuit and an output of said inverter and a second measuring transmitter which is coupled to said bus bar, and wherein said filter input is coupled to said bus bar through said second measuring transmitter.

8. The apparatus according to claim 7, wherein said valve voltage is a phase-to-phase voltage, said inverter is a three-phase inverter, said first measuring transmitter is coupled to said output of said inverter so as to pick up at least one of said phase-to-phase voltages, and the second measuring transmitter is coupled to said bus bar so as to pick up at least one of said phase-to-phase voltages at said bus bar.

9. The apparatus according to claim 8, wherein the valve voltages of all three phases are sensed by said measuring transmitter means, and said means for producing a binary measuring signal produces a binary measuring signal for the duration of the margin angle of each phase of said inverter.

10. The apparatus according to claim 9, further comprising means for forming a common actual margin angle value from a plurality of said binary measuring signals.

11. The apparatus according to claim 10, wherein said filter includes:
(a) network pickup member which transforms said valve voltages into an orthogonal reference system fixed in space,
(b) a first vector rotator coupled to said network pickup member and which transforms the components of the orthogonal reference system fixed in space into an orthogonal rotating reference system,
(c) a smoothing member coupled to said first vector rotator which produces transformed concurrent system components from the components at an output of said first vector rotator,
(d) a vector analyzer coupled to said smoothing member which produces an angle-and-magnitude signal from said transformed concurrent system components,
(e) means for responding to voltage shifts caused by said commutations in said valve voltages,
(f) a control element, coupled to said vector analyzer, having an integrator coupled to a sine-cosine transmitter, which operates on the angle signal from said vector analyzer,
(g) a control device coupled to said means for responding so as to control switching of a stored angle signal into said control element,
(h) a multiplier, coupled to said control element, which combines the magnitude signal of said vector analyzer with an output signal of said control element, and
(i) a transformer, coupled to said multiplier, which transforms the output signals of said multiplier back into said fundamentals of said valve voltages.

* * * * *